United States Patent [19]

Ruehle

[11] 4,134,098

[45] Jan. 9, 1979

[54] MULTIPLE REFLECTION SUPPRESSION IN MARINE SEISMIC EXPLORATION WITH LONG SOURCE AND DETECTOR ARRAYS

[75] Inventor: William H. Ruehle, Duncanville, Tex.

[73] Assignee: Mobil Oil Corporation, New York, N.Y.

[21] Appl. No.: 765,474

[22] Filed: Feb. 4, 1977

[51] Int. Cl.² .............................................. G01V 1/38
[52] U.S. Cl. .................................... 340/7 R; 181/111; 340/15.5 F
[58] Field of Search .................. 340/15.5 F, 15.5 TD, 340/7 R; 181/111, 112

[56] References Cited

U.S. PATENT DOCUMENTS

| | | | |
|---|---|---|---|
| 3,096,846 | 7/1963 | Savit et al. | 340/15.5 MC |
| 3,613,071 | 10/1971 | Quay | 340/7 R |
| 3,863,201 | 1/1975 | Briggs et al. | 340/15.5 GC |
| 3,887,897 | 6/1975 | Neitzel et al. | 340/7 R |
| 3,893,539 | 7/1975 | Mott-Smith | 340/7 R |

*Primary Examiner*—Howard A. Birmiel
*Attorney, Agent, or Firm*—C. A. Huggett; George W. Hager, Jr.

[57] ABSTRACT

In marine seismic exploration, a long array of sources efficiently transfers energy along the reflection path. Multiple reflection rejection is achieved by normal move-out discrimination at selected trace distances for each reflection. The length of the source array is changed in accordance with the geological characteristics of the sub-surface formations being explored and the reflection time of reflections from formations of interest. A split source array allows one section of the array to be moved with respect to the other to change the overall length of the array without changing the number of sources which are fired. Primary to multiple reflection enhancement is obtained by selecting only traces having source to detector offset distances with a primary to multiple amplitude response ratio greater than one.

2 Claims, 14 Drawing Figures

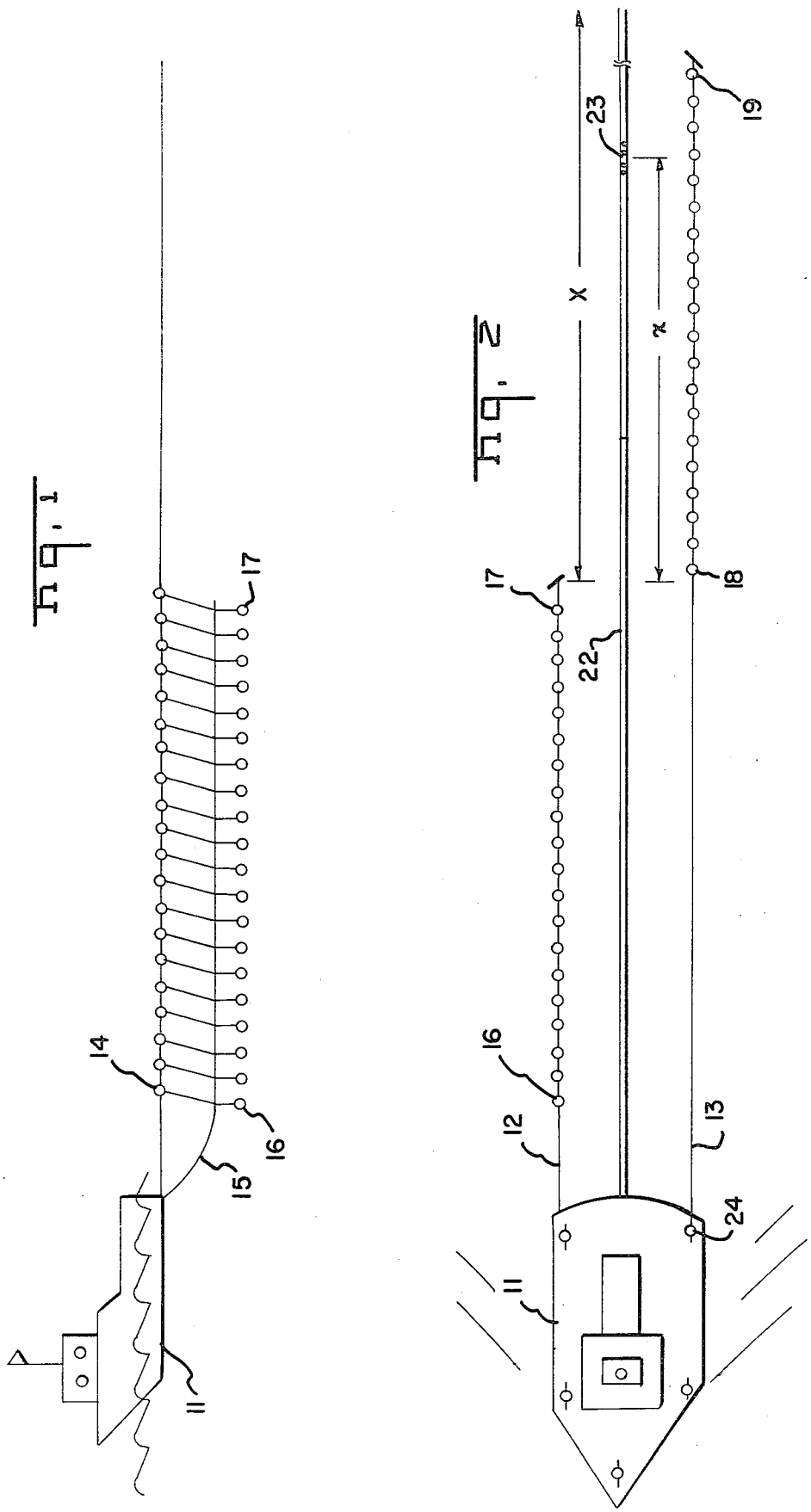

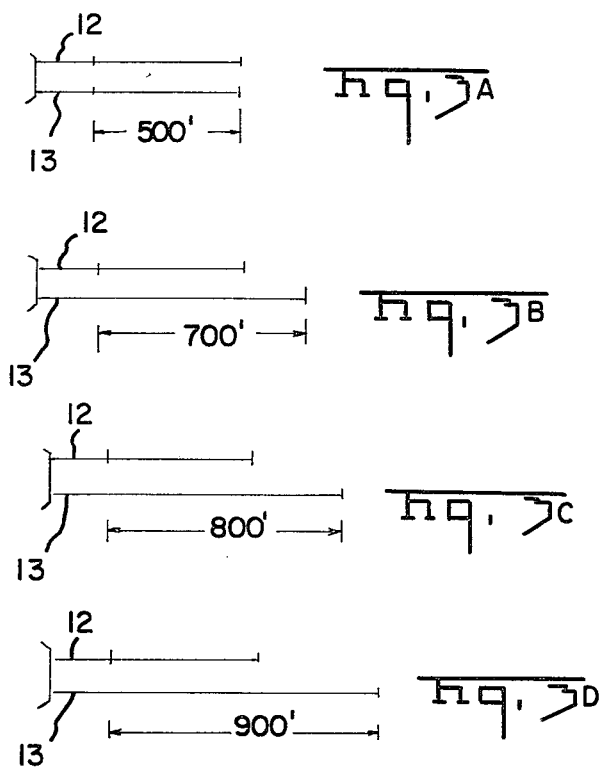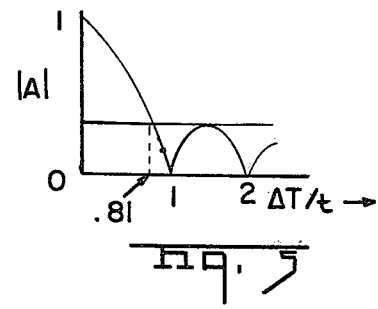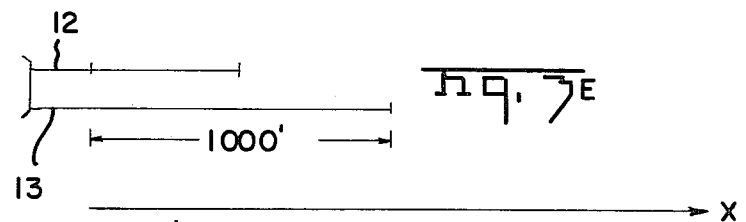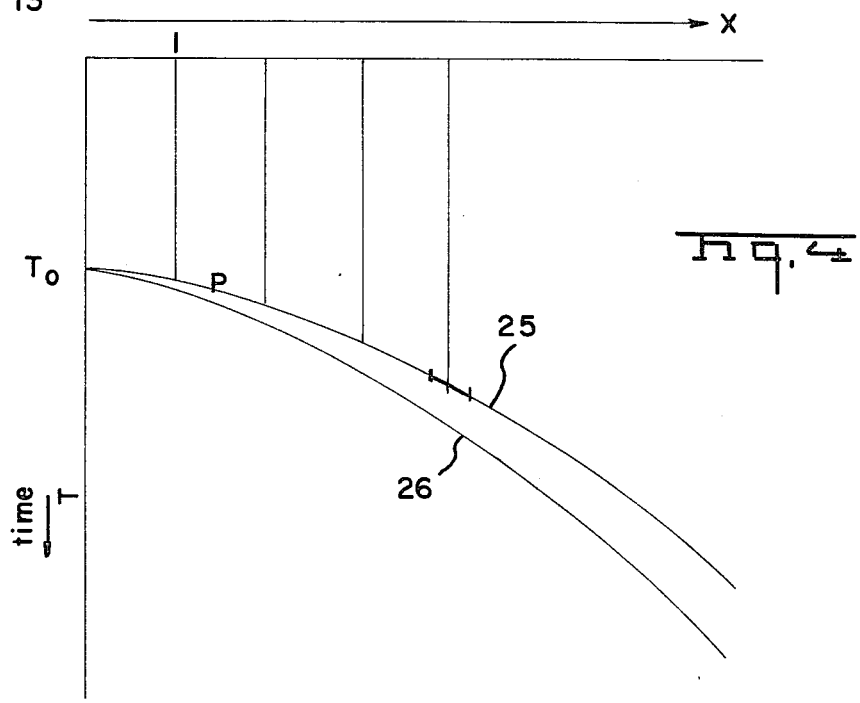

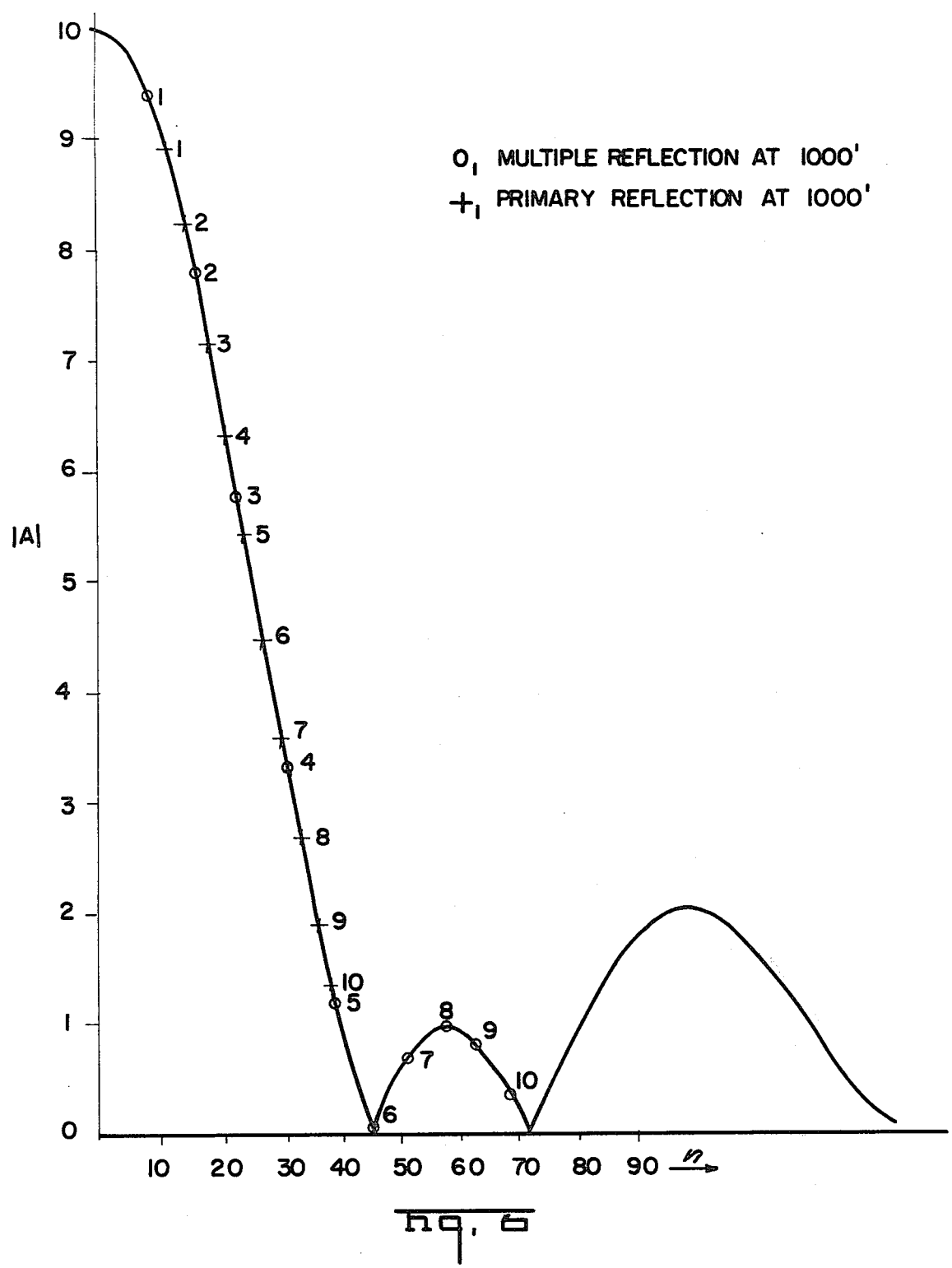

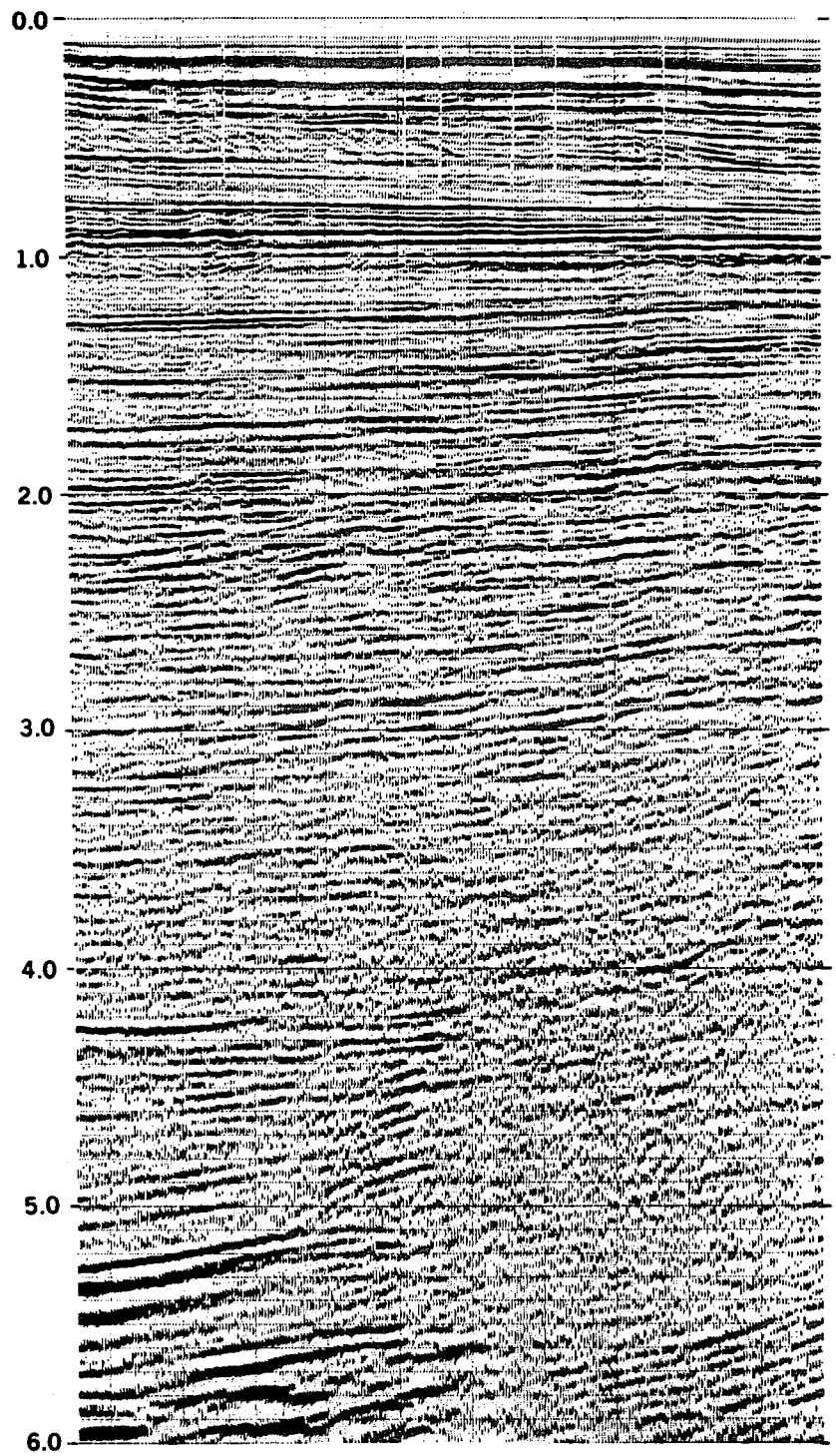
POINT SOURCE

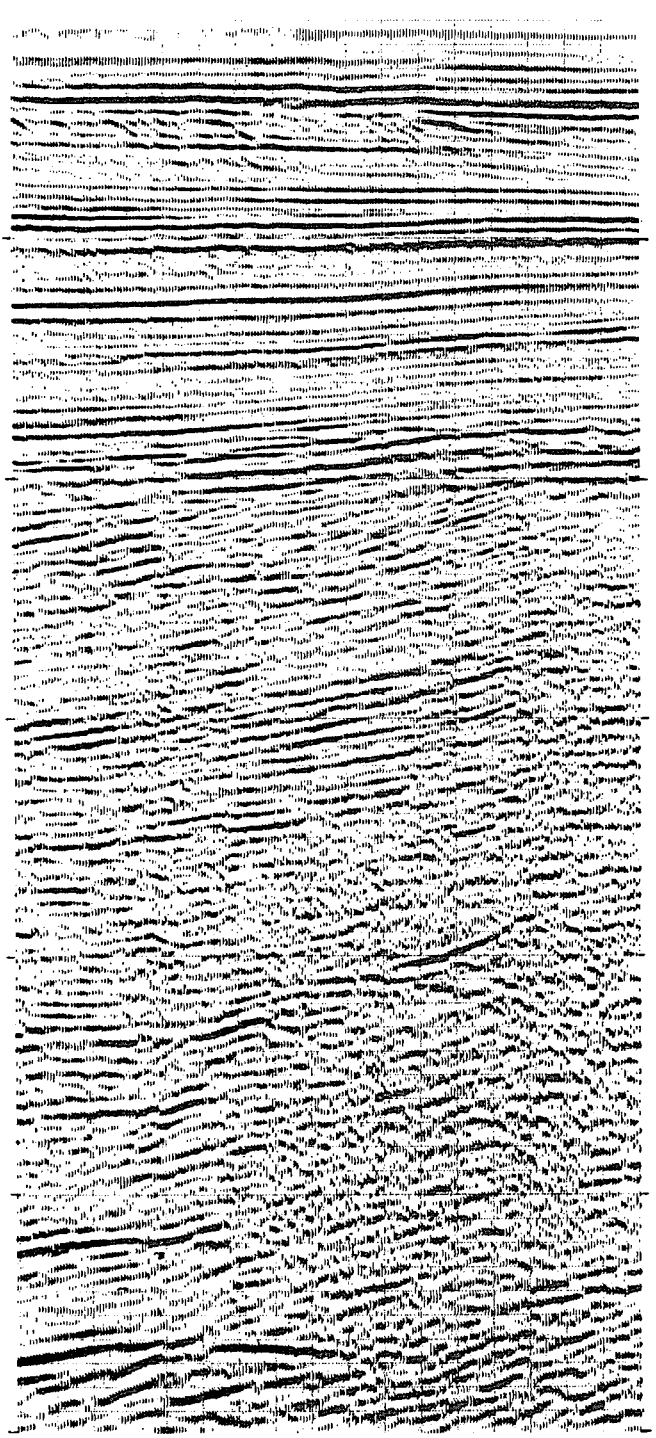
500 FOOT SOURCE

800 FOOT SOURCE

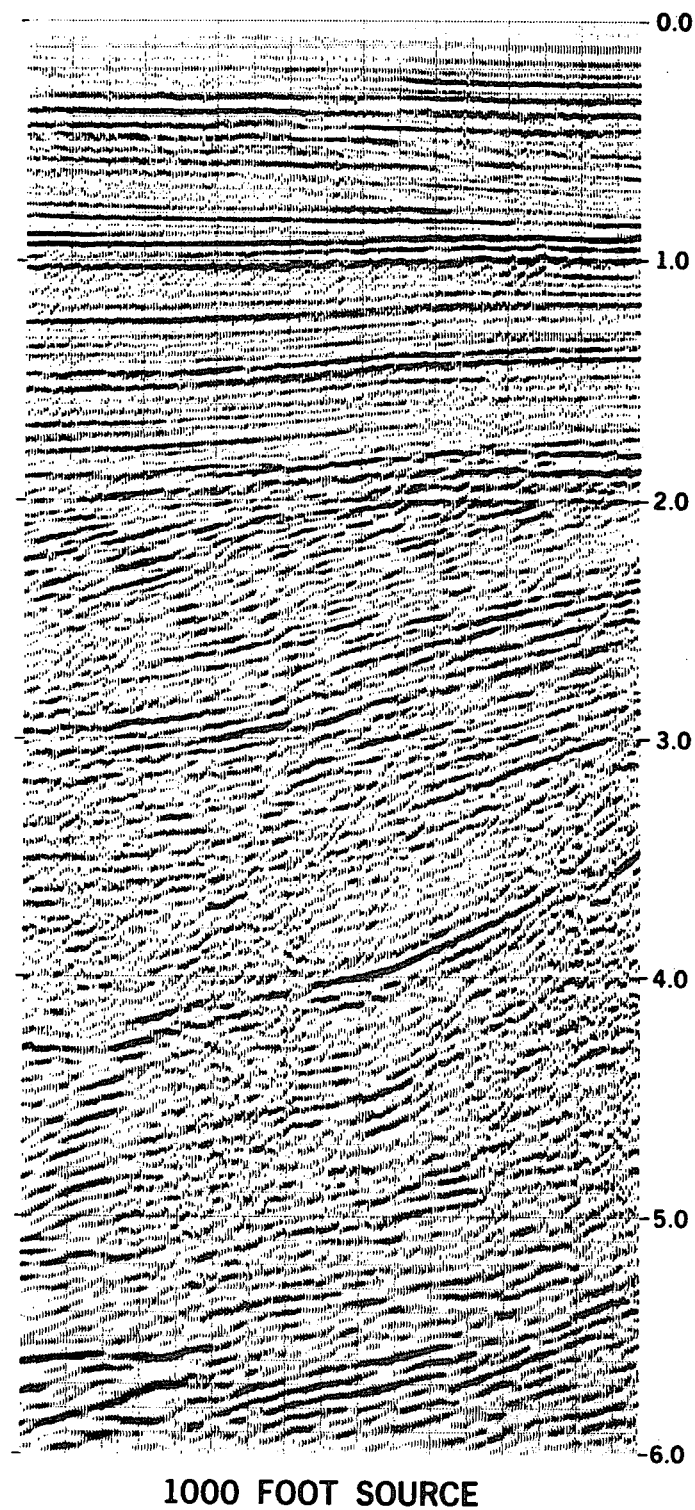
1000 FOOT SOURCE

MULTIPLE REFLECTION SUPPRESSION IN MARINE SEISMIC EXPLORATION WITH LONG SOURCE AND DETECTOR ARRAYS

BACKGROUND OF THE INVENTION

This invention relates to marine seismic exploration and more particularly to long source and receiver arrays for suppressing multiple reflections.

U.S. Pat. No. 3,491,848 — Giles and No. 3,893,539 — Mott-Smith show examples of long source and detector arrays used in seismic exploration. A long source transfers energy along the reflection path more efficiently than a point source. This increased efficiency is due to the sharply peaked amplitude response of the long source.

Many techniques have been employed to improve the signal-to-noise ratio of seismograms produced in marine seismic exploration. Conventional noise suppression, dereverberation and stacking techniques are useful. However, in some cases, the presence of multiple reflections is so pronounced that the dynamic response of the recording system is exceeded. In this case, no amount of post-shooting processing will make the seismograms useful. It is desirable to perform the exploration with an array of sources and detectors which discriminates against these multiple reflections.

RELATED CASES

Co-pending applications Ser. No. 669,077, filed Mar. 22, 1976 and Ser. No. 554,047, filed Feb. 28, 1975 — Ruehle describe long source arrays.

Co-pending application Ser. No. 715,762, filed Aug. 18, 1976, (9182) describes a long detector array.

SUMMARY OF THE INVENTION

In accordance with this invention, the length of the marine source array is changed to obtain rejection of multiple reflections by normal move-out discrimination.

In accordance with another aspect of the invention, multiple rejection is achieved by normal move-out discrimination at selected different trace distances for each reflection. This suppression occurs prior to recording the data and is in addition to the suppression produced by the stacking process.

In accordance with another important aspect of the invention, a split source array is used. One section of the array can be extended or retracted so that the total length of the array can be changed without changing the number of sources which are fired. In this manner, the length of the array can be changed in accordance with the geological characteristics of the subsurface formations being explored and the reflection time of reflections from formations of interest. In this manner, the source and detector arrays are used to reject multiple reflections by normal move-out discrimination.

The foregoing and other objects, features and advantages will be better understood from the following description and appended claims.

DESCRIPTION OF THE DRAWINGS

FIG. 1 is a side view of a marine vessel towing a long array of sources;

FIG. 2 is a top view showing the split source and the long detector array;

FIGS. 3A–3E show the two sections of the long source array in different configurations to form different lengths of the overall array;

FIG. 4 shows the hyperbolic reflection time-distance curves for a primary and a multiple reflection;

FIG. 5 shows the amplitude response of a uniformly weighted array;

FIG. 6 shows the amplitude response of a 900 foot source array;

FIG. 7A depicts a seismic data obtained with a point source;

FIG. 7B depicts seismic data obtained with a 500 foot source;

FIG. 7D depicts seismic data obtained with a 1,000 foot source.

DESCRIPTION OF A PREFERRED EMBODIMENT

Figure 7C:
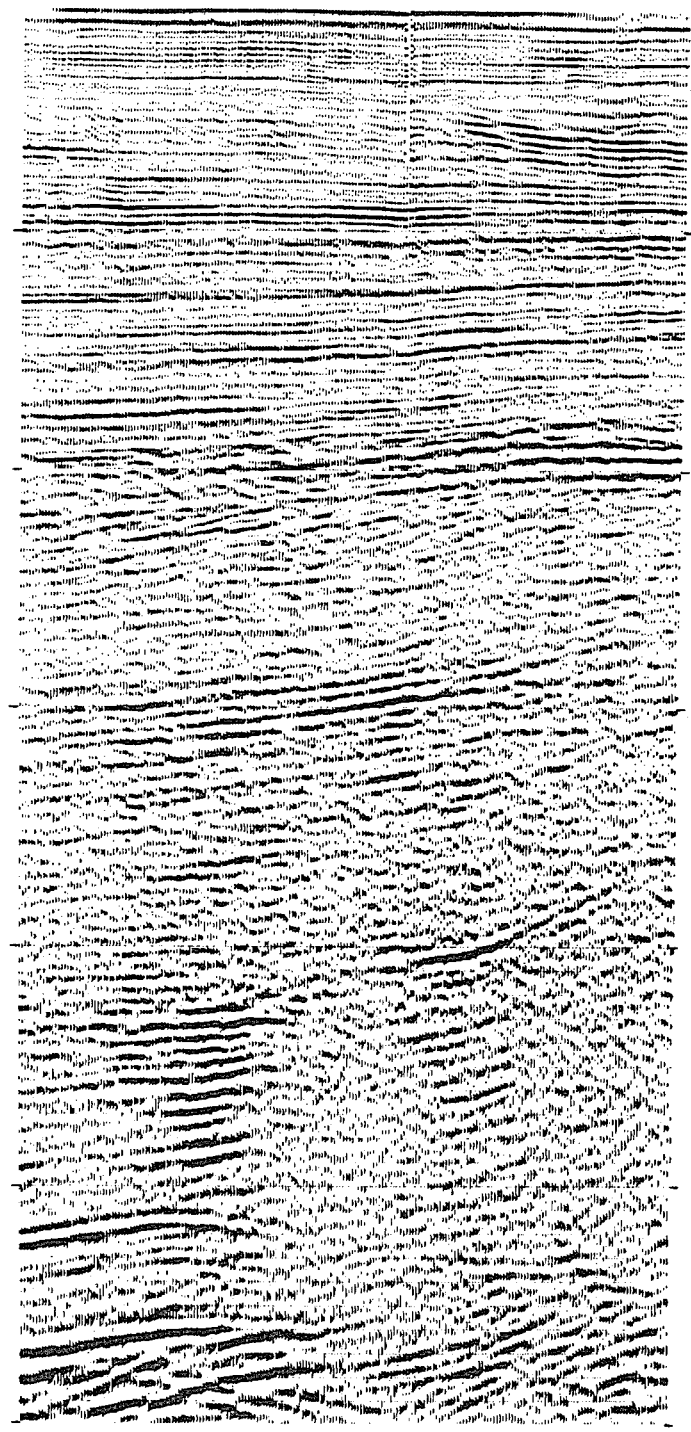
FIG. 7C depicts seismic data obtained with an 800 foot source.

Referring to FIGS. 1 and 2, a marine vessel 11 tows cables 12 and 13 which are connected to the two sections of the long source array. Buoys, such as 14, support the air hose 15 which supplies air to the sources which may be of the type described in U.S. Pat. No. 3,506,085 — Loper.

Two sections of twenty sources each are provided. One section includes the sources 16 . . . 17 and the other section includes the sources 18 . . . 19. Paravanes at the ends of the sections control them.

A long detector string 22 extends between the split sections of sources. The detector string 22 contains a plurality of approximately equally spaced detectors. The outputs of these detectors are applied to a shipboard compositor of the type described, for example, in "Digital Quality Seismic Streamer System" by W. H. Luehrmann, Paper No. OTC-2019, Sixth Annual Offshore Technology Conference, Houston, Texas, May 6–8, 1974, or in U.S. Pat. No. 3,887,897 — Neitzel. Such a compositor has the capability of combining the outputs of a plurality of detectors. That is, detector arrays are formed, one of which is indicated at 23 in FIG. 2. The offset distance from the center of the source array to any particular detector array is designated x. The maximum usable offset distance from the source to an array is designated X.

The winch indicated at 24 provides the means for extending and retracting cable 13 so that the section attached to this cable is extended and retracted with respect to the other section.

FIGS. 3A–3E depict the manner in which the total array length can be changed without changing the number of sources which are fired. In the example under consideration, each section has twenty sources spaced at 25 foot intervals. When the cable 13 is fully retracted, the length of the source array is 500 feet as shown in FIG. 3A. When cable 13 is fully extended, the length of the source array if 1000 feet as depicted in FIG. 3E. FIGS. 3B–3D show intermediate lengths of 700 feet, 800 feet and 900 feet.

The length of the source array is changed to achieve the best rejection of multiple reflections by normal move-out discrimination. Normal move-out discrimination is also achieved by selecting detectors having an offset distance x in which the ratio of the amplitude response of primary to multiple reflections is greater than one. The rejection of multiple reflections by normal move-out discrimination will be better understood from the following.

Consider the conventional hyperbolic distance-time plot shown in FIG. 4. The hyperbolic curve 25 specifies the occurrence time of a reflection on a seismogram as a function of the offset distance x between the source and the detector producing the seismogram. The hyperbolic curve 26 is for a multiple reflection. The curves are different for different reflections (actually different reflection times). FIG. 4 shows that for each reflection time, selected offset distances x will reject multiple reflections by normal move-out discrimination. The selected distances depend on the geology of the formation being explored, and particularly depend upon acoustic velocity V and dip α of the formation being explored.

For a particular primary reflection, there is move-out per unit length $\delta t_p$ and a multiple move-out per unit length $\delta t_m$. The move-out per unit length is the slope of the curve 25 or 26. It is given by:

$$\delta t_p = \frac{x_{max}}{T} \frac{1}{V^2} \pm T_0 \frac{\sin\alpha}{V} \quad (1)$$

$$T = \frac{x^2}{V^2} + T_0^2 \pm \frac{2xT_0}{V} \sin\alpha \quad (2)$$

where x is the offset distance from the source to an array, T is the reflection time, $T_0$ is the zero offset reflection time, V is the acoustic velocity characteristic of the earth, α is the dip of the subsurface formations, and τ is the period of the seismic energy.

The total move-out ΔT is related to the length of an array by $\Delta T = L\delta t$ where L is the length of the array. It is common to specify the amplitude response of such an array in terms of ΔT/τ where τ is the period of the seismic pulse. See Schoenberger Michael, "Optimization and Implementation of Marine Seismic Arrays", "GEOPHYSICS", Vol. 36, No. 6, page 1038, 1039. This is shown in FIG. 5.

In accordance with this invention, the source array has a length such that ΔT/τ is equal to K, K≦1. A typical value for K is 0.81. In this way, the amplitude response on the main lobe is as high as the peak of the secondary lobe.

Consider the following example of the way in which the length $L_{max}$ of the source is selected.

In this example, the formation of interest produces reflections at 2.0 seconds with a velocity of 12,000 feet per second and a dip of 5°. Multiple reflections are present at 0° dip and 8,000 feet per second velocity. Assume the seismic pulse has a period of τ = 0.040 seconds.

Move-out per unit length for the primary and multiple reflections can be determined from equations (1) and (2) above for the reflection zones of interest. These are tabulated for various offset distances x in the table which follows:

TABLE I

| $T_0$ | V | α | 1000 | 2000 | 3000 | 4000 | 5000 | 6000 | 7000 | 8000 | 9000 | 10000 | 11000 | 12000 | 13000 |
|---|---|---|---|---|---|---|---|---|---|---|---|---|---|---|---|
| $\delta t_p$P for 2.0 sec. | 12000 | 5 | .107 | .141 | .174 | .206 | .237 | .267 | .296 | .324 | .351 | .376 | .400 | .423 | .445 |
| $dt_m$M for 2.0 sec. | 8000 | 0 | .078 | .155 | .230 | .303 | .373 | .439 | .501 | .559 | .613 | .662 | .708 | .750 | .788 |

In accordance with the criteria of this invention $\Delta T/\tau = L\delta t/\tau = 0.81$.

Solving the foregoing for L, we get:

$$L = 0.81\tau/\delta t \quad (3)$$

$$L = 0.81 (0.040)/\delta t \quad (4)$$

The maximum usable trace distance X is assumed to be 10,000 feet. From the foregoing table, we see that for this maximum source to detector offset, the primary move-out is:

$$\delta t_p = 0.376 \times 10^{-4}$$

Putting this in equation (4) above, we get:

$$L_{max} = 0.81 (0.040)/\delta t_p = 0.81 (0.040)/0.376$$

$$L_{max} = 862 \text{ ft.}$$

In this instance, the length of the source is set at 900 feet, the configuration shown in FIG. 3D.

The manner in which the offset distances between the source array and the detectors is selected to reject multiple reflections is as follows.

First, the primary and multiple reflection move-out per unit length for the array source length $L_{max}$ is determined for each usable source to detector offset increment. The values of ΔT/τ are obtained by multiplying the values of δt from Table I by $L_{max}$ and dividing by the period τ. That is:

$$\Delta T/\tau = \frac{900\delta t}{\tau}$$

These values are tabulated in the table below. These values are converted to values of n = 45ΔT/τ which are also tabulated below. Referring to FIG. 6, n is the unit of the horizontal axis of the response curve. The scale factor 45 converts ΔT/τ to horizontal units.

TABLE II

| | Primary | | | Multiple | |
|---|---|---|---|---|---|
| x | $\Delta T/\tau = \frac{900\delta t}{\tau}$ | n = 45ΔT/τ | $\Delta T/\tau$ | $\frac{900\delta t}{\tau}$ | n |
| 1000 | .2407 | 11 | | .176 | 8 |
| 2000 | .3170 | 14 | | .350 | 16 |
| 3000 | .3920 | 18 | | .520 | 23 |
| 4000 | .4600 | 21 | | .680 | 31 |
| 5000 | .5300 | 24 | | .840 | 38 |
| 6000 | .6000 | 27 | | .990 | 45 |
| 7000 | .6700 | 30 | | 1.130 | 51 |
| 8000 | .7300 | 33 | | 1.260 | 56.7 |
| 9000 | .7900 | 36 | | 1.380 | 62 |
| 10000 | .8500 | 38 | | 1.500 | 68 |

The amplitude response for a 900 foot source is shown in FIG. 6. FIG. 6 shows the Fourier transform of a 900 foot array as determined in the aforesaid "GEOPHYSICS" article. From FIG. 6, it can be seen that the amplitude response for the primary reflection at 1.000 foot, n = 11, is 0.89. The amplitude response for the multiple reflection at 1,000 foot, n = 8, is 0.95. These are tabulated in the table on the following page, together with the amplitude response for the other usable offset increments.

TABLE III

| X | P | M | P/M | |
|---|---|---|---|---|
| 1000 | .89 | .95 | .94 | |
| 2000 | .82 | .78 | 1.05 | |
| 3000 | .81 | .57 | 1.42 | |
| 4000 | .63 | .33 | 1.91 | |
| 5000 | .54 | .12 | 4.50 | |
| 6000 | .45 | 0 | ∞ | Optimum Trace Distances for P/M at 2.0sec. |
| 7000 | .36 | .07 | 5.14 | |
| 8000 | .27 | .10 | 2.70 | |
| 9000 | .29 | .08 | 3.60 | |
| 10000 | .13 | .03 | 4.30 | |

The ratio of the amplitude response of the primary to multiple reflections P/M is also tabulated in the foregoing table. Inspection of the P/M ratios show that a 900 foot source array will suppress multiple reflections over distances of 2000 to 10000 feet, with the maximum attenuation appearing at 6000 feet. These calculations are for a fixed period of 0.04 seconds. The seismic pulse has an amplitude spectrum centered about 0.04; thus, the ∞ ratio at 6000 feet will not be achieved, but the suppression will be large.

In this manner, the offset distances between the source and the array of detectors have best been selected to reject multiple reflections by normal move-out discrimination.

As an example of the advantages of this invention, consider the simulated seismograms shown in FIGS. 7A–7D. These figures compare seismograms obtained from a point source with those obtained from a 500 foot source, an 800 foot source and 1,000 foot source. In this case, the 1,000 foot source is superior over most of the seismic section, particularly deep.

The techniques discussed above may be used to produce receiver arrays which handle ambient noise and cooperate with the source in suppression of source-generated noise. These techniques are also applicable for trace selection and weighting in the stacking process for additional primary to multiple enhancement.

While particular embodiments of this invention have been shown and described, various modifications will occur to those skilled in the art. The appended claims are intended, therefore, to cover all such modifications within the true spirit and scope of the invention.

What is claimed is:

1. An array of seismic sources for marine seismic exploration comprising:
   first and second towing cables,
   marine seismic sources attached to approximately equally spaced intervals to said towing cables, and
   means for extending and retracting one cable with respect to the other so that the total length of the array formed by both towing cables can be changed.

2. The array of seismic sources recited in claim 1 wherein said total length is given by:

$$L_{max} = K\tau/\delta t_p$$

where $\delta t_p$ is given by:

$$\delta t_p = \frac{X}{T} \frac{1}{V^2} \pm T_0 \frac{\sin\alpha}{}$$

$$T = \frac{X^2}{V^2} + T_0^2 \pm \frac{2XT_0}{V} \sin\alpha$$

where X is the maximum usable offset distance from the source to any detector array, T is the reflection time, $T_0$ is the zero offset reflection time, V is the acoustic velocity characteristic of the earth, $\alpha$ is the dip of the subsurface formations, and $\tau$ is the period of the seismic energy.

* * * * *